2,958,634
PREPARATION OF FLUORINATED HYDRAZINES

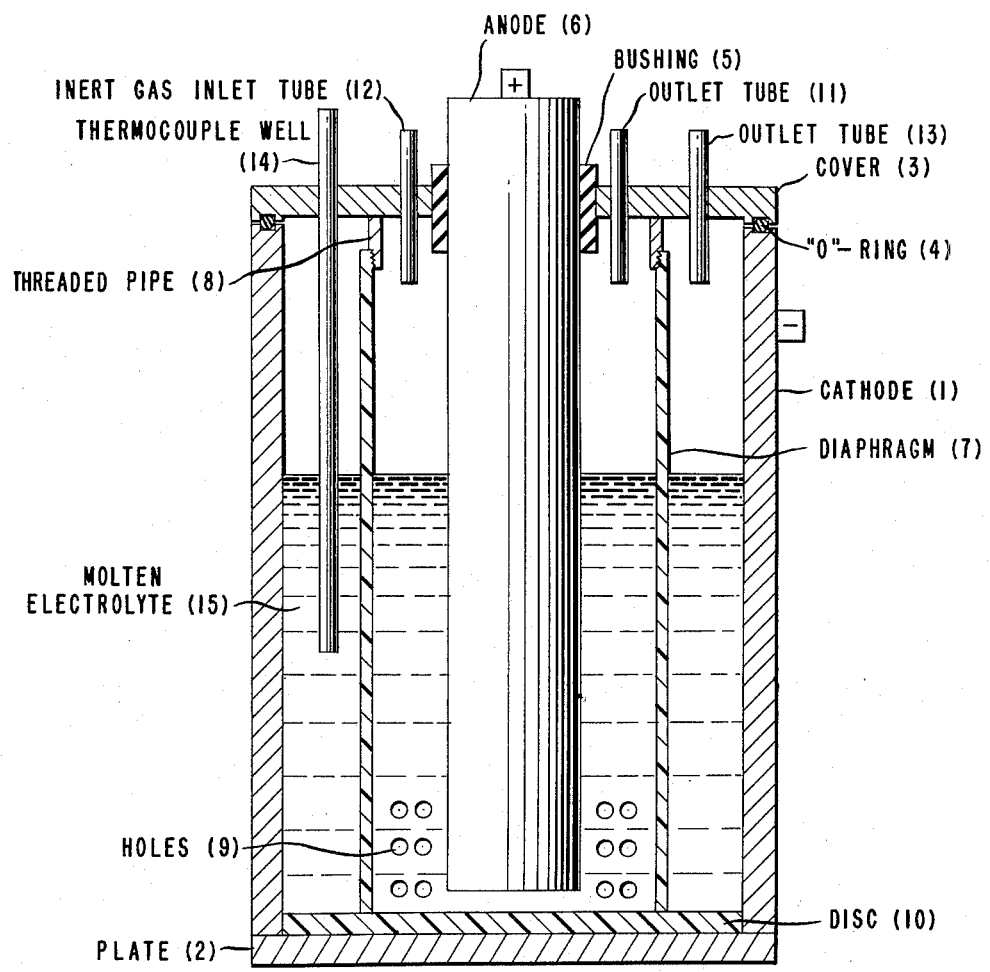

Charles Spencer Cleaver, Wilmington, Del., assignor to E. I. du Pont de Nemours and Company, Wilmington, Del., a corporation of Delaware Filed May 27, 1959, Ser. No. 816,302

7 Claims. (Cl. 204—63)

This invention relates to a new process for preparing tetrafluorohydrazine.

Tetrafluorohydrazine, $F_2N$—$NF_2$, a gas boiling at $-73°$ C., is of great scientific interest as being a virtually unknown and unstudied binary nitrogen fluoride, of which very few are known. It is also of considerable technical interest because of the recent discovery that it is an efficient initiator for the polymerization of unsaturated monomers at relatively low temperatures. Thus, for example, tetrafluoroethylene can be converted to its polymer in very good yields at temperatures of the order of 75–160° C. in the presence of catalytic amounts of tetrafluorohydrazine.

It is the principal object of the present invention to provide a simple and economic method for the preparation of tetrafluorohydrazine.

The preparation of tetrafluorohydrazine, in accordance with this invention, is accomplished by a process which comprises electrolyzing, with the use of a nickel anode, at a temperature above the melting point but below the volatilization temperature of the electrolyte, a molten mixture of ammonium bifluoride with from 0.1–0.9 mole, per mole of ammonium bifluoride, of a fluoride ion acceptor selected from the class consisting of binary fluorides of hydrogen, of elements of group III–A of the periodic table of elements having atomic numbers from 5 to 13, inclusive, and of elements of group V–A of the periodic table of elements having atomic numbers from 15 to 51, inclusive.

The periodic table referred to above is that published in Deming's "General Chemistry" (5th ed., 1944) and also used in many other reference books, e.g., the "Handbook of Chemistry and Physics," published by the Chemical Rubber Publishing Company.

The invention comprises as an essential feature the use of mixtures of ammonium bifluoride with a binary fluoride of the class defined above. In the absence of such an adjuvant, tetrafluorohydrazine is not found in the reaction product. The adjuvants suitable for use in this process in admixtures with ammonium bifluoride are hydrogen fluoride (in excess over that present in $NH_4F \cdot HF$), boron trifluoride, aluminum trifluoride, phosphorus tri- and pentafluorides, arsenic tri- and pentafluorides, and antimony tri- and pentafluorides. These fluorides have the following properties in common: they are non-salt-like in character and they are fluoride ion acceptors, i.e., they are capable of combining with an additional fluorine atom to form an anion, e.g., $(HF_2)^-$, $(PF_6)^-$, etc. Thus, they can form ternary salts with sodium fluoride. With elements capable of forming more than one binary fluoride (P, As, Sb), the fluoride ion accepting property is especially marked at the highest valency stage, i.e., the pentafluorides of these elements are more active acceptors than the trifluorides. The preferred fluoride ion acceptors for use in this process are hydrogen fluoride, boron trifluoride and phosphorus pentafluoride. Of these, boron trifluoride is especially effective.

The fluoride ion acceptor should be used in amounts within a relatively narrow range with respect to the ammonium bifluoride. If less than about 0.1 mole of fluorine ion acceptor per mole of ammonium bifluoride is used, the desired result (formation of tetrafluorohydrazine) is not achieved, even though other nitrogen-fluorine compounds, principally $NF_3$ with some $N_2F_2$, are formed. If, on the other hand, there is present more than about 0.9 mole of fluoride ion acceptor per mole of ammonium bifluoride, the mixture fuses with difficulty and is, therefore, unsuitable for an electrolytic process, or, if it remains fusible, for example when hydrogen fluoride is the adjuvant, the reaction takes a different course in that elemental fluorine becomes a major product of the electrolysis. The most favorable relative proportions of adjuvant to ammonium bifluoride from the standpoint of miscibility, melting point or volatility of the resulting mixtures will, of course, vary somewhat with each adjuvant. However, the range of 0.1–0.9, preferably 0.1–0.7 mole of fluoride ion acceptor per mole of ammonium bifluoride is satisfactory for the fluorine ion acceptors of the group defined above.

The above-described mixtures form homogeneous, one-phase melts at temperatures which vary with the nature and amount of the fluoride ion acceptor, but are, in general, in the range between 50 and 150° C. The fluoride ion acceptor is presumably present partly as a solute, partly as an ammonium salt. Even when it is normally a gas (e.g., $BF_3$, $PF_5$) it remains bound in the melt up to the volatilization temperature of the latter, which is generally within the range of 75–150° C., depending on its composition. The mixture must be in the molten state for electrolysis to take place. In practice, this means that the electrolysis temperature is normally at least 50° C., since the above-defined electrolytic mixtures are generally solid below that temperature. The electrolysis can be carried out at any desired temperature between the melting point of the mixture and its volatilization temperature, which, in general, does not exceed about 175° C. The preferred temperature range is that between 75 and 150° C.

An essential feature of the invention resides in the choice of the anode material. It has been found that a nickel anode is necessary, even when the above-described electrolytic mixtures are used, if tetrafluorohydrazine is to be produced. Thus, with anodes made of carbon or graphite or of metals such as platinum, copper, aluminum or steel, the electrolysis product does not contain tetrafluorohydrazine, although in some cases other nitrogen-fluorine compounds, chiefly $NF_3$, are produced. The composition of the cathode is not critical, and any suitable conducting material can be used, provided it is not excessively corroded by hydrogen fluoride. The cathode is advantageously made of nickel, but it can also be made of iron, steel, aluminum, copper or corrosion-resistant alloys, such as copper-nickel alloys, Monel metal or the nickel-iron-molybdenum alloy known as "Hastelloy" C.

The electrolyte may be prepared directly in the electrolytic cell by adding the fluoride ion acceptor in the desired proportions to the ammonium bifluoride previously placed in the cell. Alternatively, the electrolyte may be prepared in advance and stored until use. While the systems can tolerate some water, it is preferable to operate under substantially anhydrous conditions. Dryness can be insured, for example, by subjecting the melt to a preliminary electrolysis of short duration at the operating temperature prior to collecting the product.

The electrolysis is generally carried out at an applied voltage not exceeding 30 volts, preferably between 4 and 20 volts. In the equipment described below, these voltages produce current densities at the anode of 0.1–3 amp./sq. in. It is not essential to separate the anode product, which contains the nitrogen-fluorine compounds, from the cathode product, which is chiefly hydrogen, but it is desirable to do so in order to avoid violent reactions which might be caused by a spark. Separation of the anodic and cathodic gases may be effected by means of a suitable diaphragm, according to conventional procedures. It is also desirable to remove the anodic products from the cell as soon as they are formed, to avoid or minimize possible thermal decomposition. This can be done by passing an inert gas, such as nitrogen or argon, through the anode compartment of the cell during the electrolysis, whereby the gas produced at the anode is carried out of the cell to suitable purifying and collecting systems.

The electrolysis is normally conducted at or near atmospheric pressure. Reduced pressures can be used if desired, provided the boiling point of the electrolyte is not thereby lowered to the extent that the molten state and the necessary electrolysis temperature cannot be maintained. There is generally no special advantage in using superatmospheric pressures, although, if desired, this can be done without detriment.

The type of apparatus used in carrying out this invention is not critical. Any electrolytic cell of conventional design is satisfactory as long as it is made of material which can be heated to the operating temperature and which is not readily attacked by hydrogen fluoride.

Figure 1 is a vertical section, more or less diagrammatical, of a simple form of electrolytic cell, suitable for carrying out the process of this invention. A cell of this type was used in the examples which follow.

A nickel cylinder 1, open at the top and welded at the bottom to a nickel plate 2, serves as the container for the electrolyte bath and also functions as the cathode. This cylinder is fitted at its top with a nickel cover 3, a tight, non-conducting joint between the two parts being insured by a rubber O-ring 4 set in corresponding grooves in the circumferences of the upper edge of cylinder 1 and the lower face of cover 3. In the center of cover 3 is inserted axially, through an electrically insulating polytetrafluoroethylene bushing 5, a nickel rod 6 which serves as the anode and extends down to near the bottom of cylinder 1. The anode 6 is surrounded by a cylindrical polytetrafluoroethylene diaphragm 7, threaded at its top and held in place by a corresponding thread on a short length of nickel pipe 8 welded on the bottom face of cover 3. The lower portion of diaphragm 7, where it is submerged in the electrolyte bath, is perforated with holes 9. The purpose of this diaphragm is to separate the anode gas from the cathode gas while permitting circulation of the molten electrolyte within the cell. The lower end of the diaphragm 7 rests on a polytetrafluoroethylene disc 10, fitting closely at the bottom of cylinder 1 on plate 2, whose purpose is to prevent the gas bubbles which may form on plate 2 during the electrolysis from rising into the anode compartment, i.e., the portion of the cell comprised between anode 6 and diaphragm 7. The anode compartment is provided at the top with a tube 11 passing through cover 3 and serving as outlet for the anodic gas. It is also provided with another tube 12 through which an inert gas, such as nitrogen, can be introduced to sweep the anode compartment and help remove the anodic gas. The cathode compartment, i.e., the portion of the cell comprised between diaphragm 7 and cylinder 1 (the cathode) is also provided with an outlet tube 13 for the cathodic gas, which is chiefly hydrogen. A nickel tube 14 serving as thermocouple well passes through cover 3 and extends down into the molten electrolyte 15.

In operation, the cell is placed inside an electrically heated glass heater (not shown) of any suitable type. If desired, sand or any other suitable material may be used as heat transfer medium. The power for the electrolysis is supplied by a battery (not shown) with connections arranged so that the current can be delivered to the cell electrodes in two-volt increments, as desired, e.g., from 6–24 volts. The amperage through the cell is controlled by means of a rheostat inserted in series with the anode lead wire.

The process of this invention produces other nitrogen fluorides besides tetrafluorohydrazine. These are nitrogen trifluoride, which constitutes the major portion of the nitrogen fluorides obtained, and dinitrogen difluoride, $N_2F_2$, which is present in smaller amounts. Other reaction products are nitrogen and minor amounts of nitrogen oxides. Traces of ozone are sometimes found in the reaction product, and some hydrogen fluoride entrained from the electrolysis melt is often present.

The gaseous product coming out of the anode compartment may be given a preliminary purification, if desired, by passing it through solid sodium fluoride which removes the hydrogen fluoride, then through manganese dioxide, which decomposes the ozone. The gas is then passed through metal traps cooled to $-196°$ C., where the condensable reaction products are collected, or it can be subjected directly to low temperature fractional distillation. Tetrafluorohydrazine, which boils at $-73°$ C., is readily separable by fractionation from the other nitrogen fluorides, which boil much lower. On a small scale, the ingredients of the reaction product can be efficiently separated by gas chromatography. Tetrafluorohydrazine can be obtained in an essentially pure state in this manner.

It should be noted that the mixture of nitrogen fluorides obtained in this process can be used without separation, or even without purification, as a polymerization initiator, since both nitrogen trifluoride and dinitrogen difluoroide are also effective for this purpose. Another use for the mixture of nitrogen fluorides, or any of its components, is in the synthesis of tetrafluoroethylene by high temperature reaction with carbon followed by rapid quenching, as described for nitrogen trifluoride in U.S. Patent 2,709,186, issued May 24, 1955, to Mark W. Farlow et al.

The following examples illustrate the invention in greater detail, but are not to be construed as limiting the invention various modifications and embodiments apparent to one skilled in the art are included in the scope of the present invention.

*Example I*

To 150 g. of ammonium bifluoride placed in a polyethylene vessel cooled to 0° C. was added 49 g. of boron trifluoride through a polyethylene tube. A vigorous reaction took place between the solid ammonium bifluoride and the gaseous boron trifluoride. The resulting white solid, containing about 0.27 mole of $BF_3$ per mole of $NH_4F \cdot HF$, was placed in an electrolytic cell of the type described above.

The cell was externally heated to 108–126° C. and the melt was electrolyzed at a cell voltage of 10 volts and a current of 4–7 amperes. During the electrolysis, dry nitrogen was passed through the anode compartment at the rate of 100 cm.³/minute. The gas leaving the anode compartment was scrubbed through a sodium fluoride tower to remove any entrained hydrogen fluoride, then through a manganese dioxide tower to decompose any ozone present. After operating for about 4 hours to dry the electrolyte, the gas leaving the scrubbing towers was led through a glass trap cooled in liquid nitrogen. The condensate was transferred by distillation to a stainless steel cylinder for later analysis and utilization. The course of the reaction was also followed by taking gas samples with a syringe from a point just ahead of the cold trap and subjecting the sample to gas chromatography analysis.

One such sample analyzed as follows on a molar basis (exlusive of the nitrogen carrier gas): $NF_3$, 91.2%; $N_2F_2$ (total of both isomers), 4.1%; $N_2F_4$, 4.0%; $N_2O$, 0.4%. The portion of this sample whose peak corresponded to $N_2F_4$ was collected in a trap at $-196°$ C. and analyzed by mass spectroscopy. It was found to consist essentially of $N_2F_4$ with small amounts of impurities.

The product collected at $-196°$ C. during the course of the electrolysis was found by mass spectroscopy analysis to contain, on a molar basis, 93% of nitrogen trifluoride, 2.1% of tetrafluorohydrazine and 2.1% of dinitrogen difluoride. The remainder was nitrogen, nitrous oxide and nitric oxide.

*Example II*

Using the apparatus and procedure of Example I, a mixture of 225 g. of ammonium bifluoride and 48 g. of hydrogen fluoride (0.6 mole of HF per mole of $NH_4F \cdot HF$) was electrolyzed at 100° C., 6 volts and 7 amperes. The reaction product from the anode compartment was found by gas chromatography analysis to contain, on a molar basis and exclusive of the nitrogen carrier gas, 89% of $NF_3$, 0.5% of $N_2F_4$, 5% of each $N_2F_2$ isomer, and 0.4% of $N_2O$.

*Example III*

Using the apparatus and procedure of Example I, a mixture of 225 g. of ammonium bifluoride and 54 g. of phosphorus pentafluoride (0.11 mole of $PF_5$ per mole of $NH_4F \cdot HF$) was electrolyzed at 145° C., using a 16 volt and 6 ampere current. The product from the anode compartment was found by gas chromatography analysis to have the following molar composition, exclusive of the nitrogen carrier gas: $NF_3$, 92%; $N_2F_2$, 3.5% of each isomer; $N_2F_4$, 0.5%; $N_2O$, 0.2%.

I claim:

1. A process for the preparation of tetrafluorohydrazine, which comprises electrolyzing, with the use of a nickel anode, a molten mixture of ammonium bifluoride with from 0.1 to 0.9 mole, per mole of ammonium bifluoride, of a fluoride ion acceptor selected from the class consisting of binary fluorides of hydrogen, of elements of group IIIA of the periodic table having atomic numbers from 5 to 13, inclusive, and of elements of group VA of the periodic table having atomic numbers from 15 to 51, inclusive, at a temperature above the melting point but below the volatilization temperature of said mixture.

2. The process as set forth in claim 1 wherein the temperature is from 50° to 150° C.

3. The process as set forth in claim 1 wherein the binary fluoride is hydrogen fluoride.

4. The process as set forth in claim 1 wherein the binary fluoride is a fluoride of a group IIIA element having an atomic number of 5 to 13, inclusive.

5. The process as set forth in claim 4 wherein the binary fluoride is boron trifluoride.

6. The process as set forth in claim 1 wherein the binary fluoride is a fluoride of a group VA element having an atomic number of 15 to 51, inclusive.

7. The process as set forth in claim 6 wherein the binary fluoride is phosphorus pentafluoride.

No references cited.